United States Patent
Hakiai et al.

(10) Patent No.: US 9,061,672 B2
(45) Date of Patent: Jun. 23, 2015

(54) VEHICLE BRAKE DEVICE AND METHOD OF CONTROLLING VEHICLE BRAKE DEVICE

(75) Inventors: Motomu Hakiai, Yokohama (JP); Yoshiyasu Takasaki, Saitama (JP)

(73) Assignee: Bosch Corporation, Tokyo (JP)

( * ) Notice: Subject to any disclaimer, the term of this patent is extended or adjusted under 35 U.S.C. 154(b) by 241 days.

(21) Appl. No.: 13/703,924

(22) PCT Filed: Aug. 12, 2011

(86) PCT No.: PCT/JP2011/068434
§ 371 (c)(1),
(2), (4) Date: Feb. 7, 2013

(87) PCT Pub. No.: WO2012/032897
PCT Pub. Date: Mar. 15, 2012

(65) Prior Publication Data
US 2013/0134767 A1    May 30, 2013

(30) Foreign Application Priority Data

Sep. 9, 2010    (JP) ................................. 2010-201986

(51) Int. Cl.
*B60T 13/58*    (2006.01)
*B60T 1/10*    (2006.01)
(Continued)

(52) U.S. Cl.
CPC ................. *B60T 13/586* (2013.01); *B60T 1/10* (2013.01); *B60T 7/042* (2013.01); *B60T 8/4872* (2013.01);
(Continued)

(58) Field of Classification Search
CPC ......... B60T 1/10; B60T 13/14; B60T 13/586; B60T 13/662; B60T 7/042; B60T 8/4872; B60T 2220/804; B60T 2270/604
USPC ........................................ 303/3, 11, 151, 152
See application file for complete search history.

(56) References Cited

U.S. PATENT DOCUMENTS

| 5,853,229 A | 12/1998 | Willmann et al. |
| 6,322,166 B1 * | 11/2001 | Furuya et al. ............... 303/119.2 |

(Continued)

FOREIGN PATENT DOCUMENTS

| DE | 102008032257 | 1/2010 |
| JP | 2006096218 | 4/2006 |

(Continued)

OTHER PUBLICATIONS

International Search Report for Application No. PCT/JP2011/068434 dated Nov. 15, 2011 (2 pages).

*Primary Examiner* — Robert A Siconolfi
*Assistant Examiner* — Charles Poon
(74) *Attorney, Agent, or Firm* — Michael Best & Friedrich LLP (57) ABSTRACT

There is provided a vehicle brake device that includes hydraulic brake means for generating a hydraulic brake force and regenerative brake means for generating a regenerative brake force and distributes the hydraulic brake force and the regenerative brake force for a driver-requested brake force. The hydraulic brake means includes a pressure reducing valve that reduces hydraulic pressure of wheel cylinders. The vehicle brake device includes hydraulic brake control means for maintaining the pressure reducing valve open while the driver-requested brake force is covered by only the regenerative brake force. The hydraulic brake control means does not open the pressure reducing valve when hydraulic pressure is present in the wheel cylinders.

8 Claims, 6 Drawing Sheets

(51) Int. Cl.
- *B60T 7/04* (2006.01)
- *B60T 8/48* (2006.01)
- *B60T 13/66* (2006.01)
- *B60T 13/68* (2006.01)
- *B60W 10/08* (2006.01)
- *B60W 10/188* (2012.01)
- *B60W 30/18* (2012.01)
- *B60T 13/14* (2006.01)
- *B60L 1/00* (2006.01)
- *B60L 7/04* (2006.01)
- *B60L 7/26* (2006.01)
- *B60L 11/18* (2006.01)
- *B60L 15/20* (2006.01)

(52) U.S. Cl.
CPC ............ *B60T 13/662* (2013.01); *B60T 13/686* (2013.01); *B60T 2220/04* (2013.01); *B60T 2270/604* (2013.01); *B60W 10/08* (2013.01); *B60W 10/188* (2013.01); *B60W 30/18127* (2013.01); *B60T 13/14* (2013.01); *B60L 1/003* (2013.01); *B60L 7/04* (2013.01); *B60L 7/26* (2013.01); *B60L 11/1805* (2013.01); *B60L 15/2009* (2013.01); *B60L 2240/461* (2013.01); *B60L 2270/145* (2013.01); *Y02T 10/7005* (2013.01); *B60W 2510/182* (2013.01); *B60Y 2300/89* (2013.01); *Y02T 10/7275* (2013.01)

(56) References Cited

U.S. PATENT DOCUMENTS

| | | | |
|---|---|---|---|
| 8,746,813 B2 * | 6/2014 | Matsushita | 303/152 |
| 8,781,701 B2 * | 7/2014 | Aoki et al. | 701/70 |
| 2006/0131956 A1 | 6/2006 | Matsuura et al. | |
| 2007/0013230 A1 * | 1/2007 | Yang | 303/152 |
| 2007/0018499 A1 * | 1/2007 | Kokubo et al. | 303/151 |
| 2007/0108838 A1 * | 5/2007 | Shaffer et al. | 303/152 |
| 2007/0228821 A1 * | 10/2007 | Maki et al. | 303/151 |

FOREIGN PATENT DOCUMENTS

| | | |
|---|---|---|
| JP | 2006137221 | 6/2006 |
| JP | 2007500104 | 1/2007 |
| JP | 2009286170 | 12/2009 |
| JP | 2010111167 | 5/2010 |

\* cited by examiner

VEHICLE BRAKE DEVICE AND METHOD OF CONTROLLING VEHICLE BRAKE DEVICE

CROSS REFERENCE TO RELATED APPLICATIONS

This application is a national phase application of PCT Application No. PCT/JP2011/068434, filed Aug. 12, 2011 which claims priority to Japanese Patent Application No. 201986/2010, filed Sep. 9, 2010, the entire contents of which are hereby incorporated by reference therein.

BACKGROUND OF THE INVENTION

The present invention relates to a vehicle brake device and a method of controlling the vehicle brake device, and more particularly, to a regenerative cooperative brake device that includes hydraulic brake means and regenerative brake means and a method of controlling the regenerative cooperative brake device.

In the past, a so-called regenerative cooperative brake device, which applies a braking force to a vehicle by a hydraulic brake force generated according to the driver's operation of a brake pedal and a regenerative brake force generated by a regenerative brake device, has been known as a vehicle brake device. An object of a regenerative brake is to convert the kinetic energy of wheels during braking into electric energy and to effectively use energy. However, the maximum regenerative brake force has a limitation due to the speed of a vehicle during braking or the charge state of a battery.

For example, a so-called brake-by-wire control system where a hydraulic circuit and a brake pedal are mechanically separated from each other has been employed as such a regenerative cooperative brake device. However, the brake-by-wire control system has a complicated structure and is expensive in comparison with an existing in-line control system where a hydraulic circuit and a brake pedal are fluidically connected to each other.

As for an in-line regenerative cooperative brake device, JP-A-2006-96218 proposes that a loss-stroke is provided on a brake pedal at the time of early braking in order to improve regeneration efficiency, a regenerative brake force increased to the maximum value of a regenerative brake during the loss-stroke, and hydraulic pressure is then generated. Specifically, an operating rod of the brake pedal is provided with an operating force transmission mechanism that does not transmit an operating force of the brake pedal to a master cylinder during a predetermined state from the start of the pressing of the brake pedal. That is, a second operating rod, which is mounted on a first piston of the master cylinder, is slidably engaged in a cylindrical portion of a first operating rod mounted on the brake pedal. Accordingly, a stroke until the predetermined state from the start of the pressing of the brake pedal is referred to as the loss-stroke in which a pressing force is not transmitted to the second operating rod from the first operating rod, and only a regenerative brake force is applied in the loss-stroke. Further, if a regenerative brake force is insufficient until the predetermined state from the start of the pressing of the brake pedal, a pump for an ABS control system is driven so that hydraulic pressure is forcibly generated in wheel cylinders.

However, the improvement of a brake feeling is not sufficient in the structure disclosed in JP-A-2006-96218. In general, it is known that a relationship between pressure in the wheel cylinders and the stroke of the brake pedal is not a completely proportional relationship and a required brake pedal stroke is reduced as the pressure in the wheel cylinders is increased (hydraulic pressure is increased with a small stroke). In the structure disclosed in JP-A-2006-96218, hydraulic pressure in the wheel cylinders is substantially zero when the brake pedal reaches a predetermined state from the start of the pressing of the brake pedal if a sufficient regenerative brake force is obtained in the early stage at the time of the braking. However, if a regenerative brake force is insufficient, hydraulic pressure is forcibly generated in the wheel cylinders by the drive of the pump as described above. For this reason, when the brake pedal reaches a predetermined state from the start of the pressing of the brake pedal, hydraulic pressure is already present in the wheel cylinders. Accordingly, the operational feeling of the brake pedal after the predetermined state varies between a case where a regenerative brake force is sufficient and a case where a regenerative brake force is insufficient, in the early stage at the time of the braking Further, it is premised in JP-A-2006-96218 that the maximum regenerative brake force is constant. However, actually, the maximum regenerative brake force changes according to the speed of a vehicle, the charge state of a battery, or the like. Accordingly, a problem of a pedal feeling, when a regenerative brake force is changed after a loss-stroke, that is, while the master cylinder and a reservoir do not communicate with each other, is not yet solved.

Furthermore, a loss-stroke is provided on the operating rod of the brake in JP-A-2006-96218. Accordingly, even though a regenerative brake force is insufficient at the early stage of braking when an ABS control system fails, hydraulic pressure cannot be generated. As a result, there is a concern that a case where a braking force is not generated at all may occur. Moreover, when a booster disposed between the brake pedal and the master cylinder fails, the generation of hydraulic pressure is delayed by a loss-stroke although a braking force is less effective. For this reason, the braking force is far less effective.

JP-T-2007-500104 discloses means for making brake fluid escape into a low pressure accumulator when performing braking by a regenerative brake and pumping brake fluid from the accumulator by a motor pump unit, which is to be electrically controlled, when increasing hydraulic pressure, as means for obtaining a comfortable brake feeling. However, when brake fluid escapes into the low pressure accumulator in JP-T-2007-500104, a discharge valve is opened while hydraulic pressure is present in the wheel cylinder. The discharge valve is usually on/off controlled. Accordingly, when the discharge valve is opened under pressure, significant vibration and rough sounds are generated.

CITATION LIST

Patent Literature

[PTL 1] JP-A-2006-96218
[PTL 2] JP-T-2007-500104

SUMMARY OF THE INVENTION

An object of the invention is to obtain a vehicle brake device that can effectively use a regenerative brake force, obtain a comfortable brake pedal feeling, and prevent noise caused by the operation of a valve during braking by an existing in-line system, and a method of controlling the vehicle brake device.

According to the invention, there is provided a vehicle brake device that includes hydraulic brake means for generating a hydraulic brake force and regenerative brake means for generating a regenerative brake force and distributes the hydraulic brake force and the regenerative brake force for a driver-requested brake force. The hydraulic brake means includes a pressure reducing valve that reduces hydraulic pressure of wheel cylinders. The vehicle brake device includes hydraulic brake control means for maintaining the pressure reducing valve open while the driver-requested brake force is covered by only the regenerative brake force. The hydraulic brake control means does not open the pressure reducing valve when hydraulic pressure is present in the wheel cylinders. According to this structure, since the vehicle brake device includes the hydraulic brake control means for maintaining the pressure reducing valve open while the driver-requested brake force is covered by only the regenerative brake force, brake fluid can flow in a hydraulic circuit according to the operation of a pedal even when the requested brake force is sufficiently covered by the regenerative brake force. As a result, a driver can obtain a good operational feeling of a brake pedal by naturally pressing the brake pedal. Therefore, it is possible to make the best use of a regenerative brake force and to ensure a good brake pedal feeling. Further, since the hydraulic brake control means does not open the pressure reducing valve when hydraulic pressure is present in the wheel cylinders, problems of significant vibration and noise do not occur when the valve is opened under pressure.

According to the invention, in the vehicle brake device, the hydraulic brake means includes an accumulator communicating with the pressure reducing valve, and brake fluid is stored in the accumulator when the pressure reducing valve is opened. According to this structure, since brake fluid is stored in the accumulator when the pressure reducing valve is opened, it is possible to temporarily store extra brake fluid of the wheel cylinders, when the requested brake force is sufficiently covered by the regenerative brake force, in the accumulator.

According to the invention, the vehicle brake device may further include a booster and regenerative brake control means for stopping the generation of the regenerative brake force in association with jump-in characteristics of the booster. According to this structure, the stop of the generation of the regenerative brake force is associated with the jump-in characteristics of the booster. Accordingly, it is possible to prevent reaction, which is applied from the master cylinder, from being affected by the change of the regenerative brake force by making the regenerative brake force substantially become zero at the time when, for example, a jump-in area is ended. As a result, it is possible to maintain a good pedal feeling.

According to the invention, in the vehicle brake device, the driver-requested brake force may be covered by only the hydraulic brake force at a time when a jump-in area of the booster is ended. According to this structure, since the driver-requested brake force is covered by only the hydraulic brake force at the time when the jump-in area is ended, a value of the regenerative brake force substantially becomes zero. Accordingly, it is possible to prevent reaction, which is applied from the master cylinder, from being affected by the change of the regenerative brake force, so that it is possible to maintain a good pedal feeling.

According to the invention, in the vehicle brake device, a value of the regenerative brake force may substantially become zero at a time when a jump-in area of the booster is ended. According to this structure, since the value of the regenerative brake force substantially becomes zero at the time when the jump-in area is ended, it is possible to prevent reaction, which is applied from the master cylinder, from being affected by the change of the regenerative brake force. Accordingly, it is possible to maintain a good pedal feeling.

According to the invention, in the vehicle brake device, the regenerative brake control means stops the generation of the regenerative brake force on the basis of the operation amount of a brake pedal. According to this structure, since the regenerative brake control means stops the generation of the regenerative brake force on the basis of the operation amount of the brake pedal, it is possible to prevent reaction, which is applied from the master cylinder, from being affected by the change of the regenerative brake force by not using a regenerative brake at the time of, for example, infrequent high deceleration (high pressing force) braking Accordingly, it is possible to maintain a good brake pedal feeling.

According to the invention, there is provided a method of controlling a vehicle brake device that includes hydraulic brake means for generating a hydraulic brake force and regenerative brake means for generating a regenerative brake force and distributes the hydraulic brake force and the regenerative brake force for a driver-requested brake force. The hydraulic brake means includes a pressure reducing valve that reduces hydraulic pressure of wheel cylinders. The pressure reducing valve is maintained open while the driver-requested brake force is covered by only the regenerative brake force. The pressure reducing valve is not opened when hydraulic pressure is present in the wheel cylinders. According to this structure, since the pressure reducing valve is maintained open while the driver-requested brake force is covered by only the regenerative brake force, brake fluid can flow in a hydraulic circuit according to the operation of a pedal even when the requested brake force is sufficiently covered by the regenerative brake force. As a result, a driver can obtain a good operational feeling of a brake pedal by naturally pressing the brake pedal. Therefore, it is possible to make the best use of a regenerative brake force and to ensure a good brake pedal feeling. Further, since the pressure reducing valve is not opened when hydraulic pressure is present in the wheel cylinders, problems of significant vibration and noise do not occur when the valve is opened under pressure.

According to the invention, the pressure reducing valve communicates with an accumulator, and brake fluid is stored in the accumulator when the pressure reducing valve is opened. According to this structure, since brake fluid is stored in the accumulator when the pressure reducing valve is opened, it is possible to temporarily store extra brake fluid of the wheel cylinders, when the requested brake force is sufficiently covered by the regenerative brake force, in the accumulator.

According to the invention, the brake device includes a booster, and the generation of the regenerative brake force is stopped in association with jump-in characteristics of the booster. According to this structure, the stop of the generation of the regenerative brake force is associated with the jump-in characteristics of the booster. Accordingly, it is possible to prevent reaction, which is applied from the master cylinder, from being affected by the change of the regenerative brake force by making the regenerative brake force substantially become zero when, for example, a jump-in area is ended. As a result, it is possible to maintain a good pedal feeling.

According to the invention, the driver-requested brake force is covered by only the hydraulic brake force at a time when a jump-in area is ended. According to this structure, since the driver-requested brake force is covered by only the hydraulic brake force at the time when the jump-in area is ended, a value of the regenerative brake force substantially becomes zero. Accordingly, it is possible to prevent reaction, which is applied from the master cylinder, from being affected by the change of the regenerative brake force, so that it is possible to maintain a good pedal feeling.

According to the invention, a value of the regenerative brake force substantially becomes zero at a time when a jump-in area is ended. According to this structure, since the value of the regenerative brake force substantially becomes zero at the time when the jump-in area is ended, it is possible to prevent reaction, which is applied from the master cylinder, from being affected by the change of the regenerative brake force. Accordingly, it is possible to maintain a good pedal feeling.

According to the invention, the generation of the regenerative brake force is stopped on the basis of the operation amount of a brake pedal. According to this structure, it is possible to prevent reaction, which is applied from the master cylinder, from being affected by the change of the regenerative brake force by not using a regenerative brake at the time of, for example, infrequent high deceleration (high pressing force) braking Accordingly, it is possible to maintain a good brake pedal feeling.

According to the invention, it is possible to provide a vehicle brake device that can effectively use a regenerative brake force, obtain a comfortable brake pedal feeling, and prevent noise caused by the operation of a valve during braking by an existing in-line system, and a method of controlling the vehicle brake device.

DETAILED DESCRIPTION

Embodiments of the invention will be described below with reference to FIGS. 1 to 6.

Figure 1:
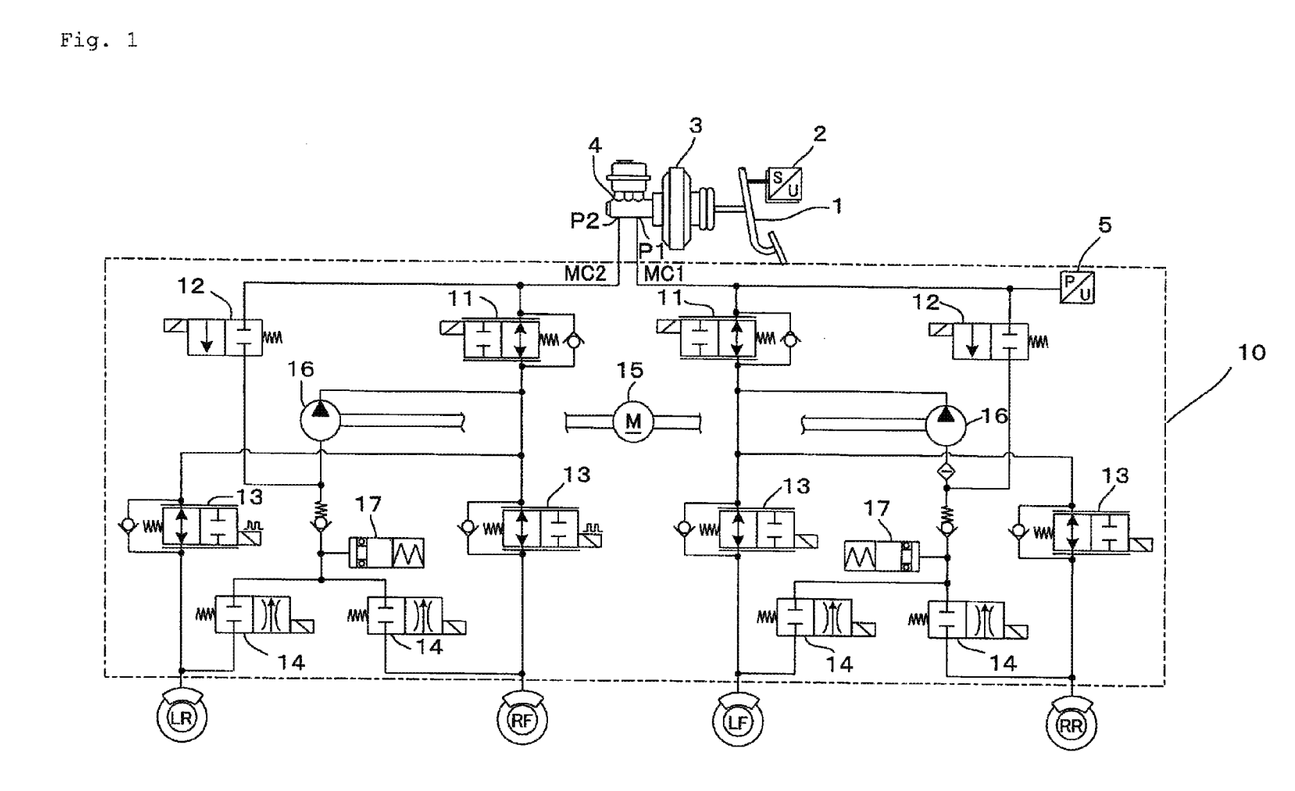
FIG. 1 is a view showing an example of a hydraulic circuit of a vehicle brake device according to an embodiment of the invention.

FIG. 1 shows an example of a hydraulic circuit 10, which forms hydraulic brake means, of a vehicle brake device to which the invention is applied. As shown in FIG. 1, this embodiment is applied to a so-called X-pipe type hydraulic circuit that includes two brake lines and brakes one front wheel and a rear wheel provided at the position diagonal to the front wheel as a pair on each line. However, the hydraulic circuit to which the invention is applied is not limited to the X-pipe type hydraulic circuit, and may be, for example, a so-called II-pipe type hydraulic circuit, which separately brakes front wheels and rear wheels, and the like. Further, the invention can be widely applied to vehicles that include not only four-wheeled vehicles but also two-wheeled vehicles.

The invention is applied to a vehicle brake device that includes regenerative brake means and hydraulic brake means and distributes a hydraulic brake force and a regenerative brake force for a driver-requested brake force. Accordingly, although not shown, a wheel driving motor, which functions as a wheel driving source during traveling and functions as a generator during braking to generate a regenerative brake force, is mounted on a vehicle that is an object to be controlled and a brake controller and a motor controller for controlling this motor are electrically connected to each other. The brake controller controls the regenerative brake force by giving a regenerative brake command value to the motor controller, and the motor controller outputs the maximum value of a regenerative brake force, which can be output at the present time, to the brake controller.

Inputs are further given to the brake controller from wheel speed sensors (not shown) that detect the speeds of the respective wheels (RF, LR, LF, and RR), and the like other than a stroke sensor 2 that is mounted on a brake pedal 1 and a master cylinder hydraulic pressure sensor 5 that detects hydraulic pressure in a master cylinder 4. Further, wheel cylinder hydraulic pressure sensors, which detect hydraulic pressure in the respective wheel cylinders, are not provided in this embodiment since not necessary. Accordingly, the vehicle brake device to which the invention is applied does not need to include wheel cylinder hydraulic pressure sensors.

In the hydraulic circuit 10 shown in FIG. 1, a pressing force applied to the brake pedal 1 is amplified by a booster 3 and transmitted to the master cylinder 4 functioning as a hydraulic pressure generating source. Two pressurizing chambers defined by primary and secondary pistons (not shown) are formed in the master cylinder 4. The respective pistons are pressed according to the operation of the brake pedal, so that brake fluid flows into the hydraulic circuit 10 through hydraulic pressure ports P1 and P2 communicating with the respective pressurizing chambers. Further, the booster 3 is a pneumatic booster in the related art, and is connected to the brake pedal 1 by an input rod (not shown). The amplified pressing force is transmitted to the master cylinder 4 through a pushrod (not shown) connected to the primary piston. Further, like a booster in the related art, the booster 3 has so-called jump-in characteristics. Accordingly, a predetermined gap (in other words, a jump-in area) is formed between the input rod and a reaction disc mounted on the pushrod so that an area where reaction is very small until the input rod of the booster 3 is mechanically connected to the pushrod of the master cylinder 4 is formed.

Brake pipe lines MC1 and MC2 extend from the hydraulic pressure ports P1 and P2 of the master cylinder 4 toward wheel cylinders of the respective wheels (RF, LR, LF, and RR). As described above, the hydraulic circuit of the brake device of this embodiment is an X-pipe type hydraulic circuit. In the example of FIG. 1, the hydraulic circuit 10 is adapted so that brake fluid is supplied to a wheel brake of the right front wheel (RF) and the left rear wheel (LR) through the brake pipe line MC2 and brake fluid is supplied to a wheel brake of the left front wheel (LF) and the right rear wheel (RR) through the brake pipe line MC1.

The hydraulic circuit of each line includes a circuit control valve 11 that is a normally open type and can be linearly controlled, an inlet valve 12 that is a normally closed type and is on/off controlled, pressure booster valves 13 that are normally open type and can be linearly controlled, and pressure reducing valves 14 that are normally closed type and are on/off controlled, as electromagnetic valves. The hydraulic circuit further includes a pump 16 that is driven by a pump motor 15, and a low pressure accumulator 17. The circuit control valve 11 is provided so as to make the pressure booster valves 13 and the master cylinder 4 communicate with each other or interrupt the communication therebetween, and the inlet valve 12 is provided so as to make the master cylinder 4 and the suction side of the pump 16 communicate with each other or interrupt the communication therebetween. Since these are the same as the components for electronic stability control (ESC) in the related art, the detailed description thereof will be omitted. Further, the above-mentioned master cylinder hydraulic pressure sensor 5 is disposed on one brake pipe line (the brake pipe line MC1 in the example of FIG. 1).

Figure 2:
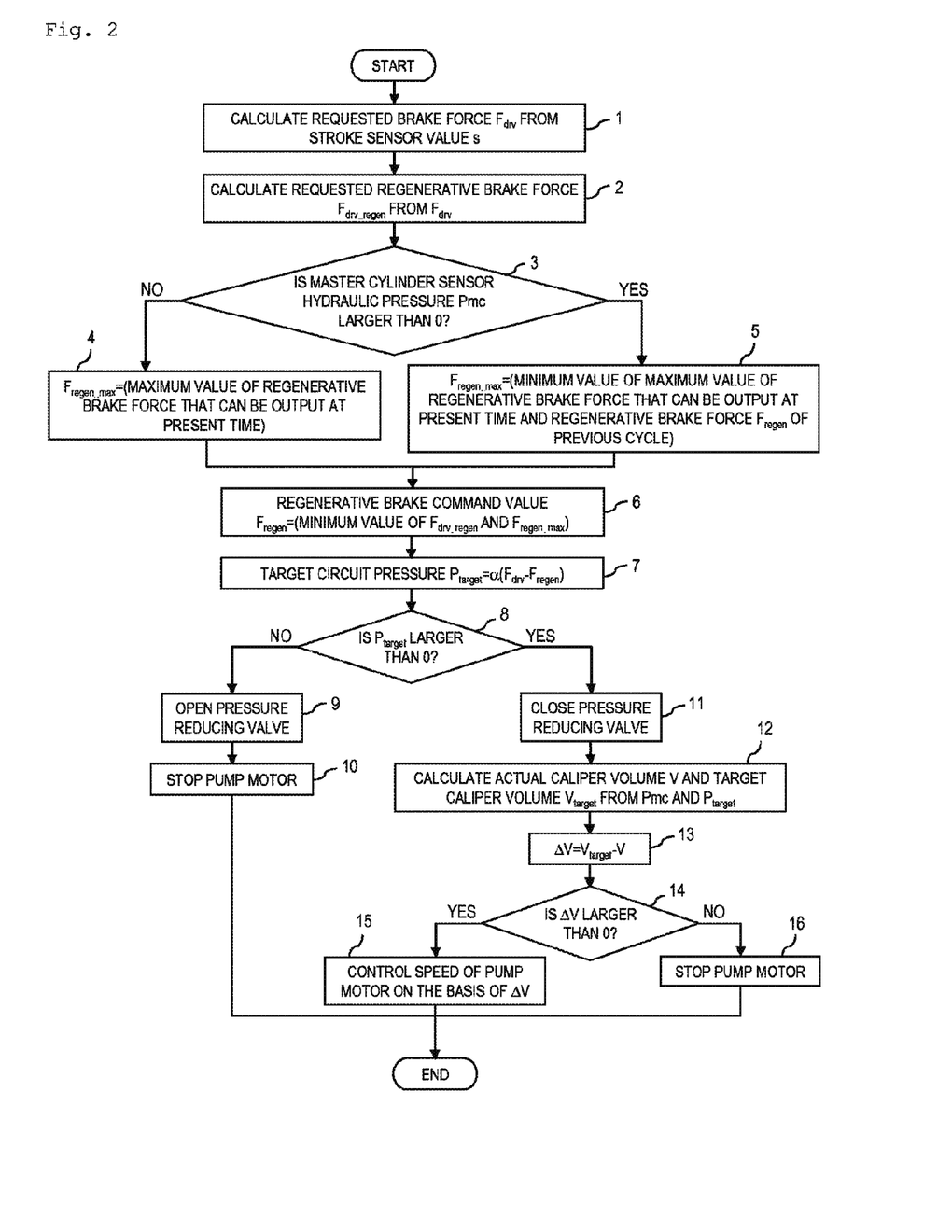
FIG. 2 is a flow chart illustrating an example of processing in a brake controller.
Figure 3:
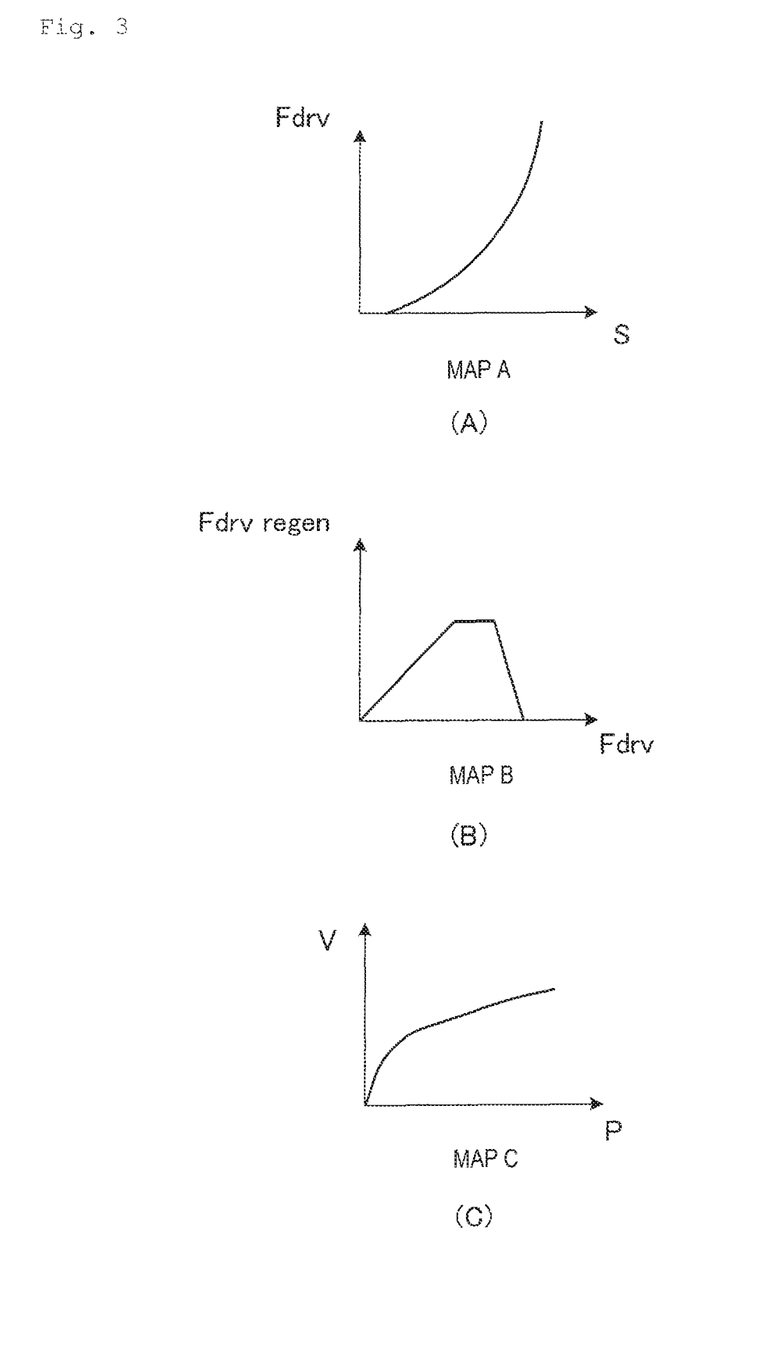
FIG. 3 is a view showing examples of maps that are used in the processing of FIG. 2.

An example of processing that is performed by the brake controller of the vehicle brake device is illustrated in a flow chart of FIG. 2.

First, the brake controller calculates a driver-requested brake force $F_{drv}$, which represents a target braking force, on the basis of a stroke sensor value s of the stroke sensor 2 that is mounted on the brake pedal 1. For this calculation, a map A shown in FIG. 3A, in which a corresponding relationship between the stroke sensor value s and the driver-requested brake force $F_{drv}$ has been set in advance, is stored in the brake controller. Accordingly, the brake controller calculates the driver-requested brake force $F_{drv}$, which is a target braking force, from the stroke sensor value s and the map A (Step 1). Next, the brake controller calculates a driver-requested regenerative brake force $F_{drv\ regen}$ as a target regenerative braking force to be distributed for the driver-requested brake force $F_{drv}$ (Step 2). For this calculation, for example, a map B shown in FIG. 3B is stored in the brake controller. A corresponding relationship between the driver-requested brake force $F_{drv}$ and the driver-requested regenerative brake force $F_{drv\ regen}$ is set in the map B. In this embodiment, the driver-requested regenerative brake force $F_{drv\ regen}$ for a predetermined driver-requested brake force $F_{drv}$ is set to zero as shown in FIG. 3B. However, this characteristic will be described later.

In Step 3, it is determined whether a sensor value (hereinafter, master cylinder sensor hydraulic pressure) Pmc of the master cylinder hydraulic pressure sensor 5 is positive. If it is determined that Pmc is not positive (NO), the maximum value of a regenerative brake force, which is obtained from the motor controller and can be output at the present time, is set as the maximum regenerative brake force $F_{regen\ max}$ (Step 4). If it is determined that Pmc is positive (YES), the maximum value of a regenerative brake force, which is obtained from the motor controller and can be output at the present time, and a regenerative brake force $F_{regen}$ of a previous cycle are compared with each other and a smaller value of them is set as the maximum regenerative brake force $F_{regen\ max}$ (Step 5). Actually, it is rare that a value of Pmc becomes zero due to the reaction of the low pressure accumulator 17 when brake fluid is introduced into the low pressure accumulator 17. Accordingly, small pressure PmcO, which rises when brake fluid is introduced into the low pressure accumulator 17, may be used as an object to be compared with Pmc.

In Step 6, the driver-requested regenerative brake force $F_{drv\ regen}$ and the maximum regenerative brake force $F_{regen\ max}$ set as described above are compared with each other and a smaller value of them is set to the motor controller as a regenerative brake command value $F_{regen}$.

In Step 7, the brake controller determines target circuit pressure $P_{target}$ on the basis of predetermined calculation "$P_{target} \alpha (F_{drv} - F_{regen})$" so as to obtain a hydraulic brake force to be distributed for the driver-requested brake force $F_{drv}$. Meanwhile, α denotes a constant that is used to convert a brake force into pressure.

Then, it is determined whether the calculated target circuit pressure $P_{target}$ is positive (Step 8). If it is determined that the target circuit pressure $P_{target}$ is not positive (NO), the pressure reducing valves 14 are opened (Step 9), the pump motor 15 is stopped (Step 10), and a cycle is ended.

If it is determined that the target circuit pressure $P_{target}$ is positive (YES), the pressure reducing valves 14 are closed (Step 11). After that, in Step 12, actual caliper volume V (the volume of brake fluid of the wheel cylinders in a caliper at the present time) and target caliper volume $V_{target}$ (the volume of brake fluid of the wheel cylinders in the caliper that is required to obtain the target circuit pressure $P_{target}$) are calculated on the basis of the master cylinder sensor hydraulic pressure Pmc and the target circuit pressure $P_{target}$, respectively. For this calculation, a map C shown in FIG. 3C, in which a relationship between pressure P and caliper volume V has been set, is stored in the brake controller.

After that, a difference ΔV between the target caliper volume $V_{target}$ and the actual caliper volume V is calculated on the basis of predetermined calculation "$\Delta V = V_{target} - V$" (Step 13), and it is determined whether ΔV is positive (Step 14). If it is determined that ΔV is positive (YES), the speed of the pump motor 15 is controlled and the motor 15 is operated (Step 15) and a cycle is ended. The speed of the motor 15 at this time is determined on the basis of a value of ΔV. If it is determined that ΔV is not positive (NO), the motor 15 is stopped (Step 16) and a cycle is ended.

The cycle is repeated at a predetermined time interval. During this time, the pressure booster valves 13 are maintained open.

Due to the above-mentioned control, in the invention, the pressure reducing valves 14 are maintained open while the driver-requested brake force $F_{drv}$ is covered by only the regenerative brake force. Accordingly, brake fluid corresponding to the operation amount of the brake pedal 1 is discharged to the accumulator 17 through the pressure booster valves 13 and the pressure reducing valves 14, so that the generation of a hydraulic brake force is prevented. Therefore, even when the driver-requested brake force $F_{drv}$ is sufficiently covered by a regenerative brake force, brake fluid can flow in the hydraulic circuit 10 according to the operation of the pedal. As a result, a driver can obtain a good operational feeling of the brake pedal 1 by naturally pressing the brake pedal 1. In this way, it is possible to make the best use of a regenerative brake force and to ensure a good pedal feeling in the invention.

Moreover, in the invention, in order to solve problems of vibration and noise when the pressure reducing valves 14 are opened under pressure, it is determined whether wheel cylinder hydraulic pressure is present before the regenerative brake command value $F_{regen}$ is determined. Meanwhile, since the circuit control valve 11 and the pressure booster valves 13 are normally opened together in this embodiment, the master cylinder hydraulic pressure is substantially the same as wheel cylinder hydraulic pressure and it is possible to determine the wheel cylinder hydraulic pressure by the master cylinder sensor hydraulic pressure Pmc. Accordingly, when Pmc is positive, a smaller value of the maximum value of a regenerative brake force, which can be output at the present time, and the regenerative brake force $F_{regen}$ of the previous cycle is set as the maximum regenerative brake force $F_{regen\ max}$ and is compared with the driver-requested regenerative brake force $F_{drv\ regen}$. Therefore, for example, even though the maximum value of a regenerative brake force, which can be output during braking, is increased, it is possible to preferentially set the regenerative brake force of the previous cycle as the maximum regenerative brake force $F_{regen\ max}$ while hydraulic pressure is present in the wheel cylinders. As a result, the pressure reducing valves 14 are not opened and it is possible to avoid problems of vibration and noise when the pressure reducing valves 14 are opened under pressure.

Meanwhile, when Pmc is not positive, the maximum value of a regenerative brake force, which can be output at the present time, is set as the maximum regenerative brake force $F_{regen\ max}$ and is compared with the driver-requested regenerative brake force $F_{drv\ regen}$. Accordingly, it is possible to always make the best use of a regenerative brake force, so that it is possible to improve regeneration efficiency.

Moreover, in the invention, for example, the driver-requested regenerative brake force $F_{drv\ regen}$ can be set so as to be zero by the map B shown in FIG. 3B when the driver-requested brake force $F_{drv}$ reaches a predetermined value. The predetermined value of the driver-requested brake force $F_{drv}$ at this time corresponds to the end time of the jump-in area of the booster 3 (in other words, the time when the input rod of the booster 3 is mechanically connected to the pushrod pressing the piston of the master cylinder 4). Accordingly, it is possible to prevent reaction, which is applied to the brake pedal 1 from the master cylinder 4, from being affected by the change of a regenerative brake force, so that it is possible to maintain a good pedal feeling.

Figure 4:
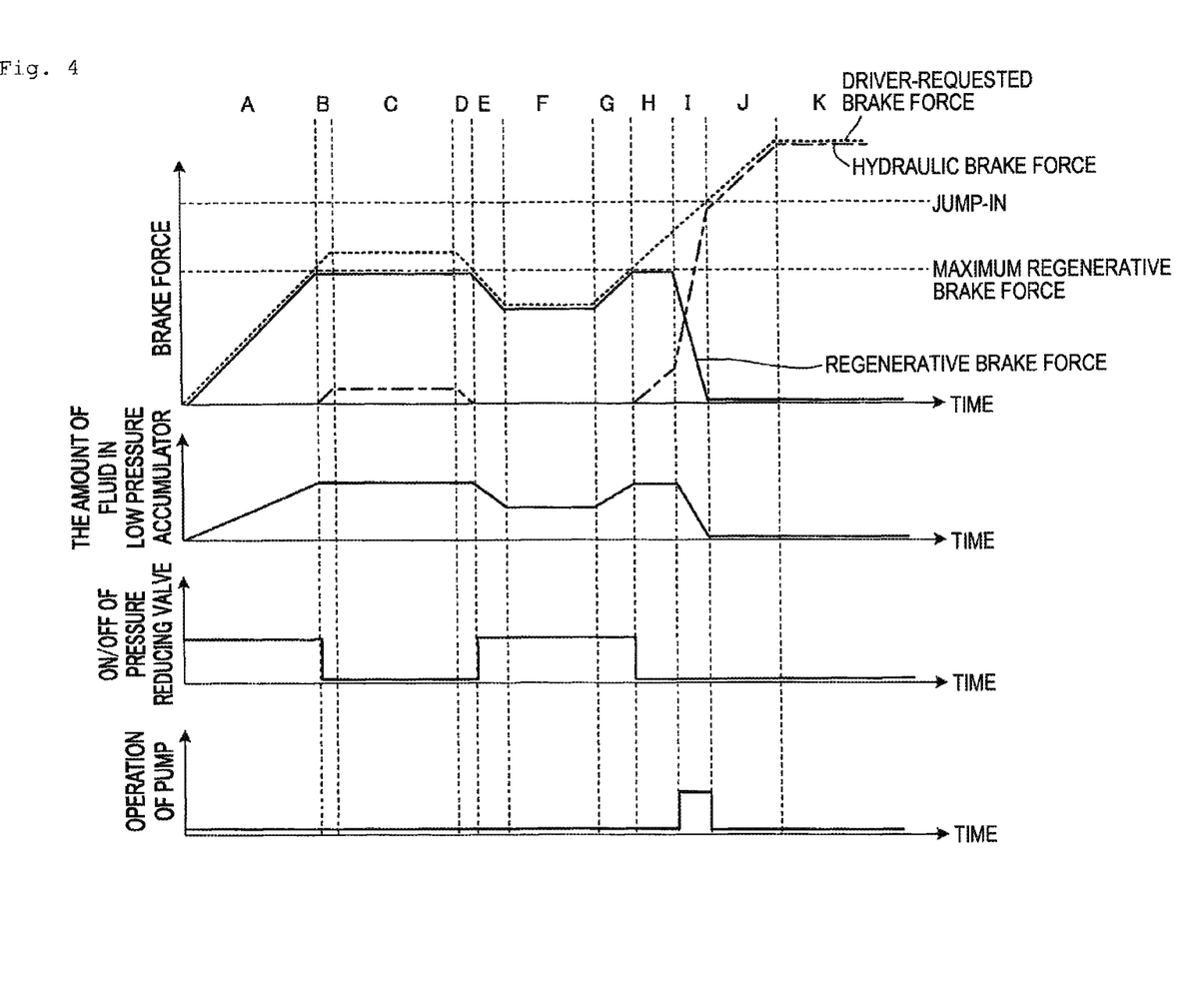
FIG. 4 is a timing chart illustrating an example of the control of the invention when the maximum regenerative brake force is constant.
Figure 5:
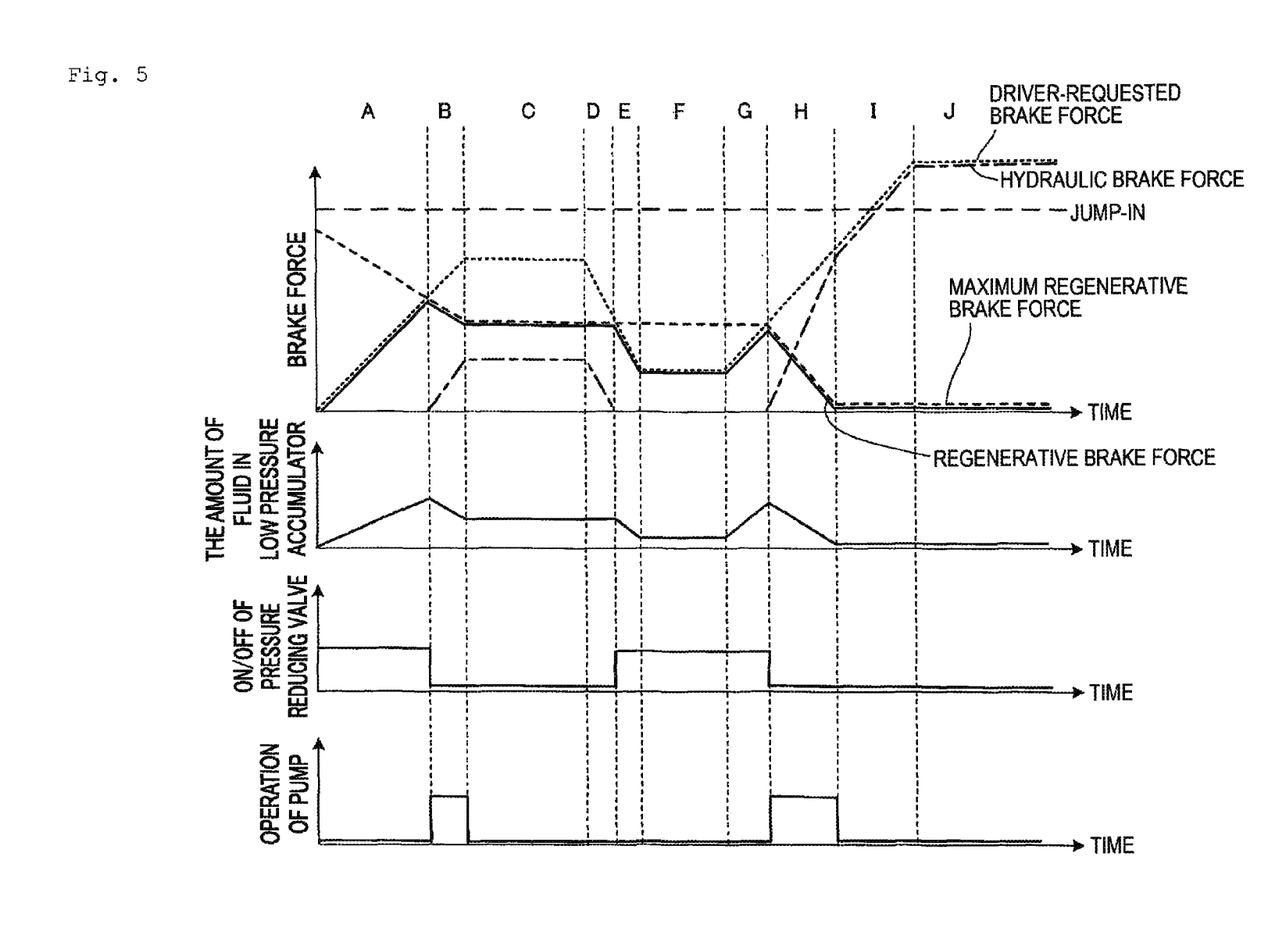
FIG. 5 is a timing chart illustrating an example of the control of the invention when the maximum regenerative brake force is reduced.
Figure 6:
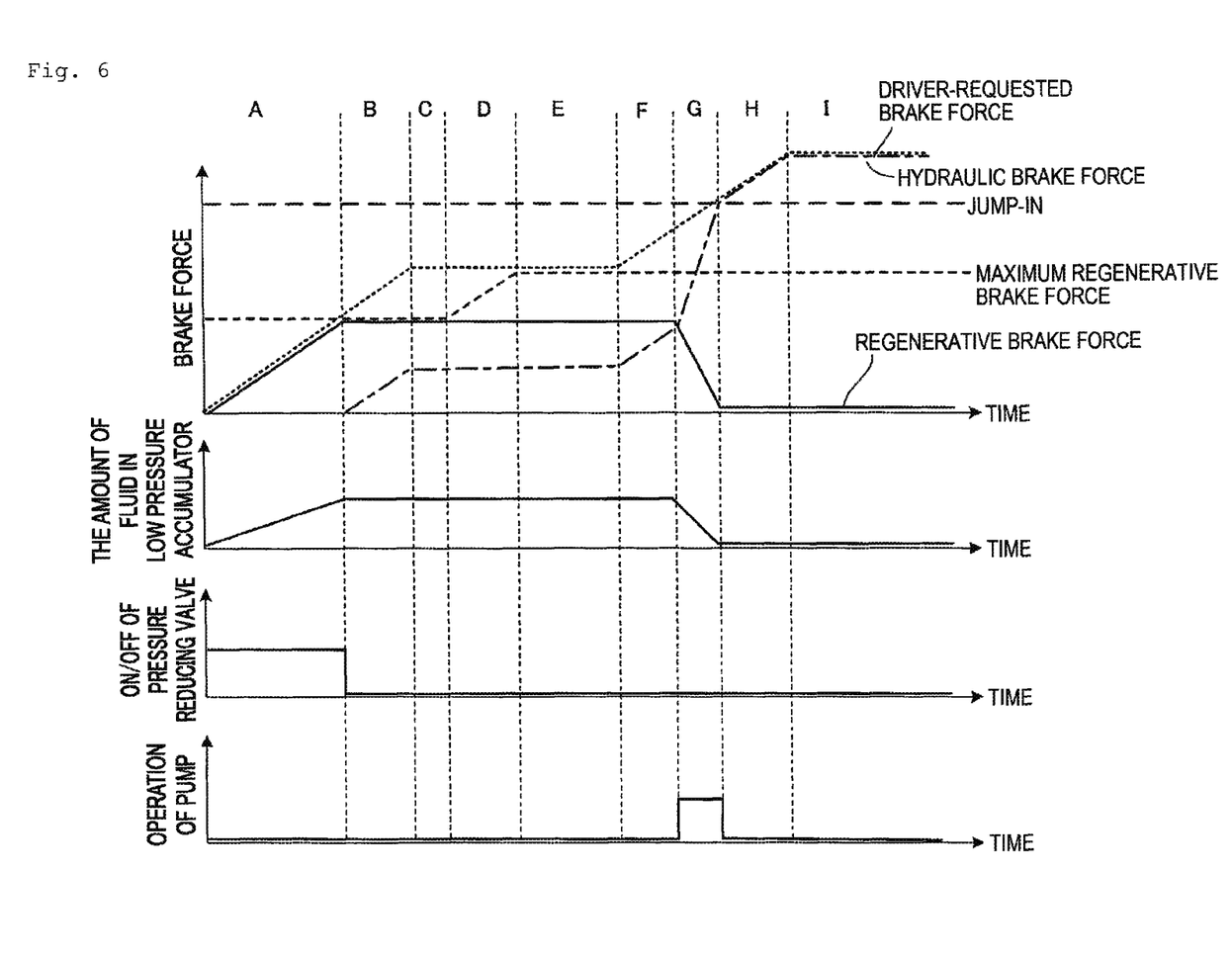
FIG. 6 is a timing chart illustrating an example of the control of the invention when the maximum regenerative brake force is increased.

FIGS. 4 to 6 are timing charts illustrating examples of the control of the invention, and illustrate examples of a brake force, the amount of brake fluid in the low pressure accumulator 17, and the operations of the pressure reducing valves 14 and the pump 16 during braking Meanwhile, unless otherwise specifically noted in FIGS. 4 to 6 and the following description, "maximum regenerative brake force" means the maximum value of the regenerative brake force that is input to the brake controller from the motor controller and can be output at the present time. As described above, the maximum regenerative brake force may be changed during braking according to the speed of a vehicle, the charge state of a battery, or the like.

(1) When the Maximum Regenerative Brake Force is Constant

FIG. 4 is an example of a timing chart when the maximum regenerative brake force is constant. The driver-requested brake force $F_{drv}$, a hydraulic brake force, and the regenerative brake force (corresponding to the regenerative brake command value $F_{regen}$) are shown by a broken line, a dashed line, and a solid line, respectively.

While the driver-requested brake force $F_{drv}$ is covered by only the regenerative brake force (areas A and E to G) as shown in FIG. 4, the pressure reducing valves 14 are opened (in other words, an ON state). Specifically, in the area A of the early braking, the driver-requested brake force $F_{drv}$ caused by the pressing of the brake pedal 1 is increased while a hydraulic brake force is zero (that is, wheel cylinder hydraulic pressure is zero). At this time, the driver-requested regenerative brake force $F_{drv\ regen}$ is also increased on the basis of the map B. Until the driver-requested regenerative brake force $F_{drv\ regen}$ becomes larger than the maximum regenerative brake force (that is, the maximum regenerative brake force is set to a regenerative brake command value $F_{regen}$) so that the target circuit pressure $P_{target}$ becomes positive, the pressure reducing valves 14 are maintained open. Accordingly, brake fluid corresponding to the operation amount of the pedal is discharged to and kept in the low pressure accumulator 17 during this time.

When the driver-requested regenerative brake force $F_{drv\ regen}$ becomes larger than the maximum regenerative brake force and the driver-requested brake force $F_{drv}$ cannot be covered by only the regenerative brake force (the target circuit pressure $P_{target}$ is positive), the pressure reducing valves 14 are closed and a hydraulic brake force corresponding to the operation amount of the pedal is generated. While the hydraulic brake force is present, a smaller force of the maximum regenerative brake force and the regenerative brake force $F_{regen}$ of the previous cycle is compared with the driver-requested brake force $F_{drv\ regen}$. However, since the target circuit pressure $P_{target}$ is positive, the pressure reducing valves 14 are still closed.

After a driver releases the pressing of the brake pedal 1 and the hydraulic pressure in the wheel cylinders substantially becomes zero by the return of the brake pedal 1, the maximum regenerative brake force and the driver-requested regenerative brake force $F_{drv\ regen}$ are compared with each other again. While the driver-requested brake force $F_{drv}$ is covered by only the regenerative brake force (the target circuit pressure $P_{target}$ is not positive), the pressure reducing valves 14 are maintained open.

When the driver-requested brake force $F_{drv}$ is increased again by the pressing of the brake pedal 1 and the driver-requested regenerative brake force $F_{drv\ regen}$ becomes larger than the maximum regenerative brake force so that the target circuit pressure $P_{target}$ becomes positive, the pressure reducing valves 14 are closed.

When the driver-requested brake force $F_{drv}$ reaches a predetermined value determined by the map B shown in FIG. 3B, the regenerative brake force is reduced to zero regardless of the increase of the driver-requested brake force $F_{drv}$. At this time, the time when the regenerative brake force becomes zero corresponds to a value of a driver-requested brake force $F_{drv}$ at the end point of the jump-in area of the booster 3.

As described above, the map B used to perform this control is shown in, for example, FIG. 3B. As described above, the time when the driver-requested regenerative brake force $F_{drv}$ regen becomes zero in the map B corresponds to the value of the driver-requested brake force $F_{drv}$ at the end of the jump-in area. Accordingly, it is possible to prevent reaction, which is applied to the brake pedal 1 from the master cylinder 4, from being affected by the change of the regenerative brake force, so that it is possible to maintain a good pedal feeling.

When the regenerative brake force is forcibly reduced in this way, wheel cylinder hydraulic pressure needs to be rapidly increased in regard to the operation amount of the brake pedal. However, predetermined calculation "$\Delta V = V_{target} - V$" is performed in the brake controller. Accordingly, if it is determined that $\Delta V$ is positive, the pump motor 15 is controlled to a speed based on the value of $\Delta V$, so that it is possible to significantly increase a hydraulic brake force in regard to the operation amount of the pedal.

Meanwhile, the time (the value of the driver-requested brake force $F_{drv}$) when the reduction of the regenerative brake force is started is not limited to the map shown in FIG. 3B. It is preferable that the reduction of the regenerative brake force be started at the later time (at the time closer to the end of the jump-in area) in terms of regeneration efficiency. However, if the reduction of the driver-requested regenerative brake force is started too late, it is necessary to rapidly increase a hydraulic brake force toward the end of the jump-in area. In this case, it is necessary to operate the pump motor 15 at a high speed and a pedal feeling is also affected. Meanwhile, if the reduction of the regenerative brake force is started at the early time, the load of the motor 15 or the deterioration of a pedal feeling is avoided but regeneration efficiency is reduced.

(2) When the Maximum Regenerative Brake Force is Reduced

FIG. 5 illustrates an example of a timing chart when the maximum regenerative brake force is reduced during braking As in FIG. 4, the driver-requested brake force $F_{drv}$, a hydraulic brake force, and the regenerative brake force (corresponding to the regenerative brake command value $F_{regen}$) are shown by a broken line, a dashed line, and a solid line, respectively.

While the driver-requested brake force $F_{drv}$ is covered by only the regenerative brake force (areas A and E to G) as shown in FIG. 5, the pressure reducing valves 14 are opened. Specifically, in the area A of the early braking, the driver-requested brake force $F_{drv}$ caused by the pressing of the brake pedal 1 is increased while a hydraulic brake force is zero. At this time, the driver-requested regenerative brake force $F_{drv\ regen}$ is also increased on the basis of the map B. Until the driver-requested regenerative brake force $F_{drv\ regen}$ becomes larger than the maximum regenerative brake force so that the target circuit pressure $P_{target}$ becomes positive, the pressure reducing valves 14 are maintained open. Accordingly, brake fluid corresponding to the operation amount of the pedal is discharged to and kept in the low pressure accumulator 17 during this time.

When the driver-requested regenerative brake force $F_{drv\ regen}$ becomes larger than the maximum regenerative brake force and the driver-requested brake force $F_{drv}$ cannot be covered by only the regenerative brake force (the target circuit pressure $P_{target}$ is positive), the pressure reducing valves 14 are closed and a hydraulic brake force corresponding to the operation amount of the pedal is generated. While the hydraulic brake force is present, a smaller force of the maximum regenerative brake force and the regenerative brake force $F_{regen}$ of the previous cycle is compared with the driver-requested regenerative brake force $F_{drv\ regen}$. However, since the target circuit pressure $P_{target}$ is positive, the pressure reducing valves 14 are still closed.

Further, since the driver-requested brake force $F_{drv}$ is increased and the maximum regenerative brake force is reduced immediately after the pressure reducing valves 14 are closed in the example of FIG. 5, a required hydraulic brake force is significantly increased. However, predetermined calculation "$\Delta V=V_{target}-V$" is performed in the brake controller. Accordingly, if it is determined that $\Delta V$ is positive, the pump motor 15 is controlled to a speed based on the value of $\Delta V$, so that it is possible to significantly increase a hydraulic brake force in regard to the operation amount of the pedal.

After a driver releases the pressing of the brake pedal 1 and the hydraulic pressure in the wheel cylinders substantially becomes zero by the return of the brake pedal 1, the maximum regenerative brake force and the driver-requested regenerative brake force $F_{drv\ regen}$ are compared with each other. While the driver-requested brake force $F_{drv}$ is covered by only the regenerative brake force (the target circuit pressure $P_{target}$ is not positive), the pressure reducing valves 14 are maintained open.

When the driver-requested brake force $F_{drv}$ is increased again by the pressing of the brake pedal 1 and the driver-requested regenerative brake force $F_{drv\ regen}$ becomes larger than the maximum regenerative brake force so that the target circuit pressure $P_{target}$ becomes positive, the pressure reducing valves 14 are closed.

When the driver-requested brake force is increased and the maximum regenerative brake force is reduced after the pressure reducing valves 14 are closed, the maximum regenerative brake force, which is smaller than the driver-requested regenerative brake force $F_{drv\ regen}$, is output as the regenerative brake command value $F_{regen}$ by the comparison between the maximum regenerative brake force and the driver-requested regenerative brake force $F_{drv\ regen}$.

Since the driver-requested brake force $F_{drv}$ is increased and the maximum regenerative brake force is reduced, a required hydraulic brake force is significantly increased. However, it is possible to rapidly increase wheel cylinder hydraulic pressure in regard to the operation amount of the brake pedal by operating the pump motor 15 on the basis of the predetermined calculation "$\Delta V=V_{target}-V$".

(3) When the Maximum Regenerative Brake Force is Increased

FIG. 6 illustrates an example of a timing chart when the maximum regenerative brake force is increased during braking. As in FIGS. 4 and 5, the driver-requested brake force $F_{drv}$, a hydraulic brake force, and the regenerative brake force (corresponding to the regenerative brake command value $F_{regen}$) are shown by a broken line, a dashed line, and a solid line, respectively.

While the driver-requested brake force $F_{drv}$ is covered by only the regenerative brake force (area A) as shown in FIG. 6, the pressure reducing valves 14 are is opened. Specifically, in the area A of the early braking, the driver-requested brake force $F_{drv}$ caused by the pressing of the pedal is increased while a hydraulic brake force is zero. At this time, the driver-requested regenerative brake force $F_{drv\ regen}$ is also increased on the basis of the map B. Until the driver-requested regenerative brake force $F_{drv\ regen}$ becomes larger than the maximum regenerative brake force so that the target circuit pressure $P_{target}$ becomes positive, the pressure reducing valves 14 are maintained open. Accordingly, brake fluid corresponding to the operation amount of the pedal is discharged to and kept in the low pressure accumulator 17.

When the driver-requested regenerative brake force $F_{drv\ regen}$ becomes larger than the maximum regenerative brake force and the driver-requested brake force $F_{drv}$ cannot be covered by only the regenerative brake force (the target circuit pressure $P_{target}$ is positive), the pressure reducing valves 14 are closed and a hydraulic brake force corresponding to the operation amount of the pedal is generated.

In the example of FIG. 6, the maximum regenerative brake force starts to increase in this state (area D). However, since the master cylinder sensor hydraulic pressure Pmc is positive, the maximum regenerative brake force and the regenerative brake force $F_{regen}$ of the previous cycle are compared with each other and the regenerative brake force $F_{regen}$ of the previous cycle, which is smaller than the maximum regenerative brake force, is preferentially set as the maximum regenerative brake force $F_{regen\ max}$. Accordingly, the target circuit pressure $P_{target}$ is positive and the pressure reducing valves 14 are not opened. According to the invention, since the pressure reducing valves 14 are not opened as described above even though the maximum value of a regenerative brake force, which can be output during braking, is increased, it is possible to avoid problems of vibration and noise when the pressure reducing valves are opened under pressure.

If the brake pedal 1 is further pressed and a predetermined driver-requested brake force $F_{drv}$ is calculated, the driver-requested regenerative brake force $F_{drv\ regen}$ is reduced to zero. The time when the driver-requested regenerative brake force $F_{drv\ regen}$ becomes zero corresponds to the end time of the jump-in area of the booster 3. Accordingly, it is possible to prevent reaction, which is applied to the brake pedal 1 from the master cylinder 4, from being affected by the change of a regenerative brake force, so that it is possible to maintain a good pedal feeling. At this time, the regenerative brake force is reduced in regard to the increase of the driver-requested brake force $F_{drv}$, but the pump motor 15 is operated on the basis of predetermined calculation "$\Delta V=V_{target}-V$". Accordingly, it is possible to rapidly increase a hydraulic brake force in regard to the operation amount of the pedal.

Further, in the invention, the pressure reducing valves 14, which are objects to be controlled in the examples of the control, may be at least one pressure reducing valve of each line of the hydraulic circuit.

The invention is not limited to only a four-wheeled vehicle, and is widely applied to vehicles including a two-wheeled vehicle. Particularly, the invention can be widely applied to a vehicle brake device including so-called regenerative cooperative brake means.

REFERENCE SIGNS LIST

1: brake pedal
2: stroke sensor
3: booster
4: master cylinder
P1, P2: hydraulic pressure port
MC1, MC2: brake pipe line
5: master cylinder hydraulic pressure sensor
10: hydraulic circuit
11: circuit control valve
12: inlet valve
13: pressure booster valve
14: pressure reducing valve
15: pump motor
16: pump
17: low pressure accumulator

What is claimed is:

1. A vehicle brake device that includes a hydraulic brake for generating a hydraulic brake force and a regenerative brake for generating a regenerative brake force and distributes the hydraulic brake force and the regenerative brake force for a driver-requested brake force, the hydraulic brake including a pressure reducing valve that reduces hydraulic pressure of wheel cylinders, the vehicle brake device comprising:
    a booster,
    a hydraulic brake control, the hydraulic brake control configured to
        maintain the pressure reducing valve open while the driver-requested brake force is covered by only the regenerative brake force,
        close the pressure reducing valve when the driver-requested brake force cannot be covered by only the regenerative brake force, and
        maintain the pressure reducing valve closed when hydraulic pressure is present in the wheel cylinders,
    wherein a value of the regenerative brake force becomes zero at a time when a jump-in area of the booster is ended.

2. The vehicle brake device according to claim 1, wherein the hydraulic brake includes an accumulator communicating with the pressure reducing valve, and brake fluid is stored in the accumulator when the pressure reducing valve is opened.

3. The vehicle brake device according to claim 1, wherein the driver-requested brake force is covered by only the hydraulic brake force at a time when a jump-in area of the booster is ended.

4. The vehicle brake device according to claim 1, wherein the regenerative brake control stops the generation of the regenerative brake force on the basis of the operation amount of a brake pedal.

5. A method of controlling a vehicle brake device that includes a hydraulic brake for generating a hydraulic brake force and a regenerative brake for generating a regenerative brake force and distributes the hydraulic brake force and the regenerative brake force for a driver-requested brake force,
    wherein the hydraulic brake includes a booster and a pressure reducing valve that reduces hydraulic pressure of wheel cylinders, the method comprising:
    maintaining the pressure reducing valve open while the driver-requested brake force is covered by only the regenerative brake force,
    closing the pressure reducing valve when the driver-requested brake force cannot be covered by only the regenerative brake force, and
    maintaining the pressure reducing valve closed when hydraulic pressure is present in the wheel cylinders,
    wherein a value of the regenerative brake force becomes zero at a time when a jump-in area of the booster is ended.

6. The method according to claim 5, wherein the pressure reducing valve communicates with an accumulator, and brake fluid is stored in the accumulator when the pressure reducing valve is opened.

7. The method according to claim 5, wherein the driver-requested brake force is covered by only the hydraulic brake force at a time when a jump-in area of the booster is ended.

8. The method according to claim 5, wherein the generation of the regenerative brake force is stopped on the basis of the operation amount of a brake pedal.

* * * * *